Dec. 9, 1969  R. J. KERSTING  3,482,884
CONTROL VALVE
Filed April 25, 1968  2 Sheets-Sheet 1

INVENTOR
RAYMOND J. KERSTING
BY

Dec. 9, 1969   R. J. KERSTING   3,482,884
CONTROL VALVE
Filed April 25, 1968   2 Sheets-Sheet 2

INVENTOR
RAYMOND J. KERSTING
BY
Joseph E. Papin

United States Patent Office 3,482,884
Patented Dec. 9, 1969

3,482,884
CONTROL VALVE
Raymond J. Kersting, Dellwood, Mo., assignor to Wagner Electric Corporation, Newark, N.J., a corporation of Delaware
Filed Apr. 25, 1968, Ser. No. 724,076
Int. Cl. B60t *15/36*
U.S. Cl. 303—5                              51 Claims

ABSTRACT OF THE DISCLOSURE

A control valve for connection between a split master cylinder and the front and rear brake motors in a split fluid pressure system including metering means for impeding pressure fluid flow from said split master cylinder to the front brake motors at fluid pressures less than a predetermined value and for proportioning the fluid pressure applied in excess of another predetermined value from said split master cylinder to the rear brake motors.

---

The present invention relates to control valves and in particular to those for use in a split braking system.

In the past, vehicle split braking systems utilized the well-known split master cylinder to respectively energize the front and rear vehicle brakes, and when the front brakes were of the disc or spot disc type differing from the usual rear drum or expending shoe type rear brake, it was necessary to employ other auxiliary valving in said split braking system to effect compatible operation of both the disc type front and shoe type rear brakes. For instance, in order to prevent energization of the disc type front brakes prior to the energization of the shoe type rear brake, it was necessary to connect a metering type fluid pressure impeding valve between the split master cylinder and the disc type front brakes, and in order to balance or distribute the braking load between said disc type front and shoe type rear brakes, it was also necessary to connect a proportioning valve between said split master cylinder and said shoe type rear brakes. Further, in the event of the failure of the portion of the split braking system for energizing the disc type front brakes, it was necessary to connect a by-pass valve between the split master cylinder and the shoe type rear brakes in parallel or shunt relation with the proportioning valve in order to obviate the proportioning function thereof and apply the maximum fluid pressure available from said split master cylinder to said shoe type rear brakes. In view of the foregoing, one of the disadvantageous or undesirable features of the past auxiliary valves for split braking systems having disc type front and shoe type rear brakes was that such valves were individual or separate units. Another disadvantageous or undesirable feature was that the utilization of such individual valve units not only increased the cost of manufacturing but also the cost of assembly, both of such individual valve units per se and on the vehicle. And another disadvantageous or undesirable feature was that the utilization of such individual valve units presented a space factor problem since under-the-hood space in modern vehicles is becoming critical.

The primary object of the present invention is to provide a control valve which overcomes the aforementioned disadvantageous or undesirable features, and this, as well as other objects and advantageous features of the present invention, will become apparent hereinafter.

In the drawings wherein like numerals refer to like parts wherever they occur.

Briefly, the present invention embodies a control valve having valve means for effecting a metered application of one supplied fluid pressure therethrough and movable in response to a predetermined value of the one supplied fluid pressure toward a non-metering position effecting open pressure fluid communication between the one supplied and applied fluid pressures, and other valve means responsive to the movement of said first named valve means to its non-metering position to isolate another supplied fluid pressure from another applied fluid pressure, said other valve means being thereafter further movable in response to increases in the other supplied fluid pressure to effect a metered proportional increase in the other applied fluid pressure.

Figure 1:
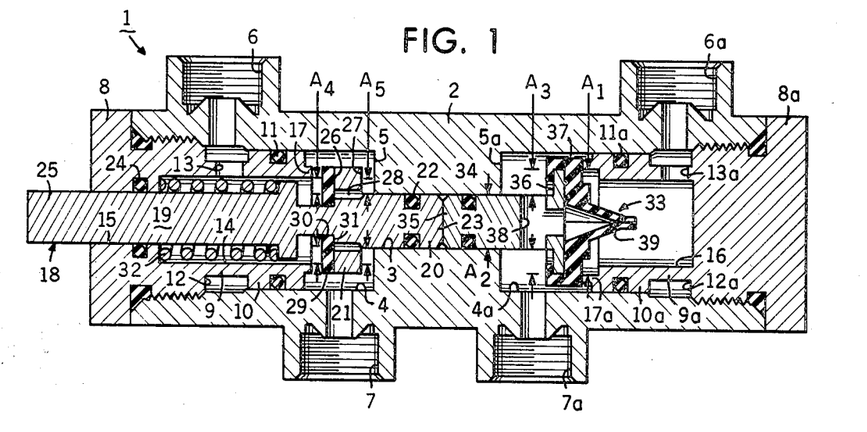
FIG. 1 is a sectional view showing a control valve embodying the present invention in cross-section.

Referring now to the drawings and in particular to FIG. 1, a control valve 1 is provided with a housing 2 having a bore 3 therein interposed between opposed counterbores 4, 4a, and opposed shoulders 5, 5a are provided at the junctures of said bore with said counterbores, respectively. Inlet ports 6, 6a which are adapted for connection with the separate pressure fluid generating chambers of a split master cylinder of a type well known to the art (not shown) are provided in the housing 2 intersecting with the counterbores 4, 4a adjacent to their mid-portions, and outlet ports 7, 7a which are adapted for respective connection with the vehicle rear and front brake motors (not shown) are provided in the housing 2 intersecting with the counterbores 4, 4a adjacent to the shoulders 5, 5a. Closure members 8, 8a are threadedly received in the open end of the counterbores 4, 4a defining end walls thereof, and extensions 9, 9a are provided on said closure members extending into the counterbores 4, 4a and having end flanges or free end portions 10, 10a thereon between the inlet and outlet ports 6, 7 and 6a, 7a, respectively, said end flanges having peripheral seals 11, 11a therein in sealing engagement with the counterbores 4, 4a. The extensions 9, 9a are provided with peripheral grooves 12, 12a therein connecting with the inlet ports 6, 6a, and a plurality of radially extending passages 13, 13a respectively connect said peripheral grooves with the larger of stepped bores 14, 15 axially provided through the closure member 8 and another bore 16 provided in the closure member 8a. Valve seats 17, 17a are provided on the extension end flanges 10, 10a opposed to and spaced from the housing shoulders 5, 5a about the larger stepped bore 14 and blind bore 15 of the closure members 8, 8a, respectively.

A resiliently urged proportioning or metering member, such as the piston indicated generally at 18, is provided with opposed leftward and rightward portions or extensions 19, 20 having a radially extending flange 21 integrally connected therebetween. The piston rightward portion 20 is slidably received in the housing bore 3 having a peripheral seal 22 adjacent to the rightward or free end 23 of said piston rightward portion in sealing engagement with said housing bore, and the piston leftward portion extends coaxially through the closure member larger stepped bore 14 in sliding engagement with the closure member smaller stepped bore 15, said piston leftward portion extending through a peripheral seal 24 provided in said closure member smaller stepped bore and having a force receiving or leftward free end 25 which extends exteriorly of the housing 2. The flange 21 is provided with opposed annular leftward and rightward faces or sides 26, 27 between the housing shoulder 5 and closure member flange 10, and a plurality of passages 28 are axially provided through said flange between said faces. A valve member or element 29 is provided in engagement with the leftward face 27 of the piston flange 21 for engagement with the closure member valve seat 17, and a central aperture 30 in said valve member is slidably received on the piston rightward portion 20, said valve member having a radially inner portion 31 adjacent to said aperture defining a unidirectional flow or check valve for sealing engagement with the piston flange leftward face 27 about the passages 28. A metering or proportioning spring 32 is pre-compressed between the shoulder defined between the closure member stepped bores 14, 15 and the piston leftward portion 19 urging the piston 18 rightwardly toward its inoperative position with the valve member 29 disengaged from the valve seat 17.

Another metering or impeding member, such as the piston indicated generally at 33, is slidably received in the housing bore 3 having a peripheral seal 34 therein in sealing engagement with said housing bore and a free or abutment end 35 normally in abutment with the free end 23 of the piston 18. The metering piston 33 extends coaxially into the housing counterbore 4a having a radially extending flange 36 provided on the rightward end thereof, and a valve member 37 is disposed on said flange and normally biased toward a position in sealing engagement with the valve seat 17a on the closure member extension 10a by the force of the metering spring 32 to isolate the fluid pressure at the inlet port 6a. Another return flow passage 38 is provided in the metering piston 31 for connection between the inlet and outlet ports 6a, 7a, and the valve member 35 is provided with central deformable lip portions 39 defining a uni-directional valve to provide pressure fluid flow only from the outlet port 7a to the inlet port 6a through the return flow passage 38, as will be described hereinafter.

It should be noted that the metering piston 33 is provided with an effective area $A_1$ which is substantially defined by the seating engagement of the valve member 37 with the valve seat 17a and subjected to the fluid pressure at the inlet port 6a, and another effective area $A_2$ is also provided on said metering piston substantially defined by the sealing engagement of the seal 34 with the housing bore 3 and also subjected to the fluid pressure at said inlet port. The difference between areas $A_1$ and $A_2$ defines another area $A_3$ on the metering piston 33 which is subjected to the fluid pressure at the outlet port 7a and opposed to the areas $A_1$, $A_2$. To complete the description of the control valve 1, substantially equal opposed annular effective areas $A_4$, $A_5$ are provided on the valve member 29 and the rightward face 27 of the proportioning piston flange 21 respectively subjected to the fluid pressures at the inlet and outlet ports 6, 7.

In the operation with the component parts of the control valve 1 positioned as shown in FIG. 1 and as described hereinabove, separate and substantially equal input or supplied fluid pressures $P_1$, $P_2$ are supplied by the split system master cylinder (not shown) to the inlet ports 6, 6a, respectively. The fluid pressure $P_1$ flows from the inlet port 6 through the peripheral groove 12, the passage 13 and the larger stepped bore 14 of the closure member extension 10 and the housing counterbore 4 to establish an output fluid pressure $P_3$ at the outlet port 7 which is effective to actuate the rear brake motors (not shown). It should be noted that when the proportioning piston 18 is in its inoperative position, as shown, the areas thereof are substantially balanced and unaffected by the input and output fluid pressures $P_1$, $P_3$; therefore, when said proportioning valve is in its inoperative position, the magnitudes of the input and output fluid pressures $P_1$, $P_3$ are substantially equal, as shown along the line OC in the graph of FIG. 2.

Figure 2:
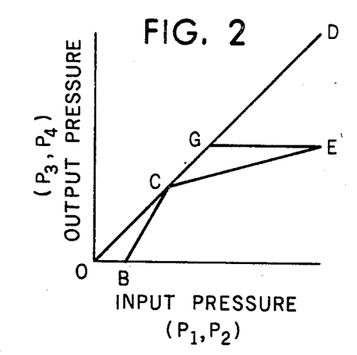
FIG. 2 is a graphical representation illustrating output pressure versus input pressure.

At the same time, the input fluid pressure $P_2$ flows from the inlet port 6a through the peripheral groove 12a and passage 13a of the closure member extension 10a into the bore 16 thereof acting on the areas $A_1$ of the valve member 37 to establish an input force $P_2A_1$ which concertedly urges the metering and proportioning pistons 33, 18 leftwardly against the compressive force $Fs$ of the spring 32; however, the spring force $Fs$ obviates such concerted movement of said metering and porportioning pistons to impede pressure fluid communication between the inlet and outlet ports 6a, 7a until the magnitude of the input fluid pressure $P_2$ attains the predetermined value B, as shown along the line OB in the graph of FIG. 2. When the input fluid pressure $P_2$ is increased to the predetermined value B, the input force $P_2A_1$ is correspondingly increased to overcome the opposing spring force $Fs$ and concertedly move the metering and proportioning pistons 33, 18 leftwardly toward a metering position of said metering piston disengaging the valve member 37 from the valve seat 17a to establish metered pressure fluid communication between the inlet and outlet ports 6a, 7a wherein the input fluid pressure $P_2$ flows from the closure member extension bore 16 through the housing counterbore 4a to establish a metered output fluid pressure $P_4$ at said outlet port. The established output fluid pressure $P_4$ at the outlet port 7a acts on the area $A_3$ of the metering piston 33 to establish an output force $P_4A_3$ in opposition to the input force $P_2A_1$ and additive to the spring force $Fs$. When the additive output force $P_4A_3$ and spring force $Fs$ attain a value substantially equal to that of the input force $P_2A_1$, the metering piston 33 is urged from its metering position to re-engage the valve member 37 with valve seat 17a and again interrupt pressure fluid communication between the inlet and outlet ports 6a, 7a. In this manner, the output fluid pressure $P_4$ is established in a predetermined ratio with the input fluid pressure $P_2$ in excess of the predetermined value B according to the following formula:

$$P_4 = \frac{P_2A_4 - F}{A_3}$$

Of course, the metering piston 33 functions, as described hereinabove, to establish corresponding metered proportional values of the output fluid presusre $P_4$ in response to further increases in the magnitude of the input fluid pressure $P_2$ in excess of the predetermined value B, as shown along the line BC in the graph of FIG. 2, and when the magnitude of the input fluid pressure $P_2$ attains the predetermined value C, the input force $P_2A_1$ overcomes the additive output and spring forces $P_4A_3Fs$ to move the metering piston 33 leftwardly toward a non-metering or open position wherein the valve member 37 is disengaged from the valve seat 17a to establish open or non-metered pressure fluid communication between the inlet and outlet ports 6a, 7a. When the metering piston 33 is in its non-metering position, the magnitudes of the input and output fluid pressures $P_2$, $P_4$ in excess of the predetermined value C are substantially equal, as shown along the line CD in the graph of FIG. 2, and the magnitude of the input fluid pressure $P_2$ in excess of the predetermined value B acts on the smaller input area $A_2$ to establish an input or holding force $P_2A_2$ for maintaining said metering piston in its non-metering position, said holding force $P_2A_2$ replacing the input and output forces $P_2A_1$ and $P_4A_3$.

When the metering piston 33 is moved to its non-metering position, as above described, the proportioning piston 18 is, of course, concertedly movable leftwardly therewith in response to the input force $P_2A_2$ and against the spring force $Fs$ to engage the valve member 29 with the valve seat 17 isolating the fluid pressure $P_1$ at the inlet port 6 from the established or applied fluid pressure $P_3$ at the outlet port 7 interrupting pressure fluid communication therebetween, and upon the engagement of said valve member with said valve seat, the magnitudes of the input pressures $P_1$, $P_2$ and output fluid pressures $P_3$, $P_4$ are substantially equal having attained the predetermined value C, as shown in the graph of FIG. 2. With the valve member 29 so engaged with the valve seat 17, the area $A_4$ of the proportioning piston 18 is acted upon by the input fluid pressure $P_1$ to establish another input force $P_1A_4$ which is additive to the spring force $Fs$ and opposed to the input force $P_2A_2$; however, the ouput fluid pressure $P_3$ acts on the area $A_5$ of said proportioning piston which is substantially equal and opposite to the area $A_4$ to establish another output force $P_3A_5$ in opposition to and balancing the input force $P_1A_4$. In view of the foregoing, it is apparent that the additive input and output forces $P_2A_2$ and $P_3A_5$ will maintain the valve member 29 engaged with the valve seat 17 against the opposing additive input and spring forces $P_1A_4$ and $Fs$ when the magnitudes of the input fluid pressures $P_1$, $P_2$ and the output fluid pressures $P_3$, $P_4$ are at the predetermined value C.

When the input fluid pressures $P_1$, $P_2$ are increased along the line OD in the graph of FIG. 2 to a value in excess of the predetermined value C, the opposed input forces $P_1A_4$ and $P_2A_2$ are correspondingly increased, and the increased input force $P_1A_4$ assisted by the spring force $Fs$ concertedly urges the proportioning and metering pistons 18, 33 rightwardly against the increased input force $P_2A_2$ and the output force $P_3A_5$ toward a proportioning or metering position of said proportioning piston disengaging the valve member 29 from the valve seat 17; however, when said proportioning piston is in its metering position, it should be noted that the input force $P_2A_2$ is effective to maintain said metering piston in its non-metering position with the valve member 37 disengaged from the valve seat 17a to maintain open pressure fluid communication between the inlet and outlet ports 6a, 7a. When the proportioning piston 18 is in its metering position, metered pressure fluid communication is established between the inlet and outlet ports 6, 7 effecting a proportional increase in the output fluid pressure $P_3$ along the line CE in the graph of FIG. 2 in the following ratio:

$$P_3 = \frac{P_1A_4 + Fs - P_2A_2}{A_5}$$

The proportional increase in the output fluid pressure $P_3$ effects a corresponding increase in the output force $P_3A_5$, and when the additive increased input and output forces $P_2A_2$ and $P_3A_5$ attain a value somewhat greater than the opposing additive increased input force and spring force $P_1A_4$ and $Fs$, proportioning and metering pistons 18, 33 are again concertedly moved leftwardly to the isolating position of said proportioning piston to re-engage the valve member 29 with the valve seat 17 and again interrupt pressure fluid communication between the inlet and outlet ports 6, 7. If the input fluid pressures $P_1$, $P_2$ are further increased, the component parts of the control valve 1 function in the same manner as described hereinabove to effect further proportional increases in the output fluid pressure $P_3$.

When the desired braking effort is attained, the split master cylinder is de-actuated to eliminate the input fluid pressures $P_1$, $P_2$ and when the input fluid pressures $P_1$, $P_2$ are so decreased along the line OD in the graph of FIG. 2 below the value of the output fluid pressure $P_3$ on the line GE of said graph, a fluid pressure differential is established across the valve member 29 when the proportioning piston 18 is in its isolating position acting to displace the uni-directional valve member portion 31 of said valve member from engagement with the flange leftward face 26 thereby permitting the return flow of the displaced output fluid pressure $P_3$ through the return passages 28 and the valve member central aperture 30 to the inlet port 6. This return flow of the displaced output fluid pressure $P_3$ when the valve member 29 is engaged with the valve seat 17 is illustrated along the line EGC in the graph of FIG. 2, and since the metering piston 33 is in its non-metering position, the output fluid pressure $P_4$ is, of course, reduced along the line DC of said graph with the input fluid pressures $P_1$, $P_2$. When the input fluid pressures $P_1$, $P_2$ and output fluid pressures $P_3$, $P_4$ are so reduced to a value less than the predetermined value C, the input force $P_1A_4$ assisted by the spring force $Fs$ overcomes the opposing additive input and output forces $P_2A_2$ and $P_3A_5$ to concertedly move the proportioning and metering pistons 18, 33 from their respective isolating and non-metering positions to their original positions wherein the valve member 29 is disengaged from the valve seat 17 re-establishing open pressure fluid communication between the inlet and outlet ports 6, 7 and wherein the valve member 37 is re-engaged with the valve seat 17a to again interrupt pressure fluid communication between the inlet and outlet ports 6a, 7a. However, when the valve member 37 is re-engaged with the valve seat 17a and the input fluid pressure $P_2$ is further reduced below the value of the output fluid pressure $P_4$, a fluid pressure differential is established across said valve member acting to displace or deform the sealing lips 39 thereby permitting the further return flow of the displaced output fluid pressure $P_4$ through the piston return flow passage 36 and said deformed valve member sealing lips to the inlet port 6.

As mentioned hereinbefore, it is desirable to obviate the proportioning function of the control valve 1 in order to insure the delivery of the maximum input fluid pressure $P_1$ to the outlet port 7 which is applied to the vehicle rear brake motors (not shown) under emergency vehicle operating conditions in the event of the failure of the input fluid pressure $P_2$ which is applied to the vehicle front brake motors (not shown). When the proportioning and metering pistons 18, 33 are in their respective isolating and non-metering positions, the input fluid pressures $P_1$, $P_2$ and output fluid pressures $P_3$, $P_4$ have magnitudes equal to or in excess of the predetermined value C; therefore, in the event of the failure of the input fluid pressure $P_2$, the input or holding force $P_2A_2$ is eliminated. Upon such elimination of the input force $P_2A_2$, the output force $P_3A_5$ is, of course, overcome by the opposing additive input and spring forces $P_1A_4$ and $Fs$ to immediately effect the concerted movement of the proportioning and metering pistons 18, 33 from their isolating and non-metering positions to their inoperative positions to effect open pressure fluid communication between the inlet and outlet ports 6, 7 and obviate the proportioning function of said proportioning piston under such emergency vehicle operating conditions. In this manner, when the proportioning function of the control valve 1 is obviated, unimpeded or non-proportioned flow of the maximum available input fluid pressure $P_1$ at the inlet port 6 is effected through the peripheral groove 12, the passage 13 and the larger stepped bore 14 of the closure member extension 10 past the disabled or by-passed valve element 29, which is maintained open in response to the spring force $Fs$ urging the proportioning and metering pistons 33, 18 toward their inoperative positions, and therefrom through the housing counterbore 4 to the outlet port 7.

Of course, it is desirable to bleed the vehicle split braking system (not shown) in which the control valve 1 is utilized at a fluid pressure having a magnitude less than the predetermined value B which, as described hereinbefore, is the value of the input fluid pressure $P_2$ necessary to effect the metering function of the metering piston 33; therefore, a manually applied force on the external end 25 of the proportioning piston 18 moves said proportioning piston against the spring 32 to contain the force thereof and displaces the proportioning piston end 23 from engagement with the metering piston end 35. With the force of the spring 32 so contained between the housing 2 and the proportioning piston 18, it is obvious that the input fluid pressure $P_2$ less than the predetermined value B acting on the area $A_2$ will urge the metering piston 33 toward its non-metering position disengaging the valve member 37 from the valve seat 17a to establish open pressure fluid communication between the inlet and outlet ports 6a, 7a for bleeding purposes at relatively low pressures less than the predetermined value B.

Figure 3:
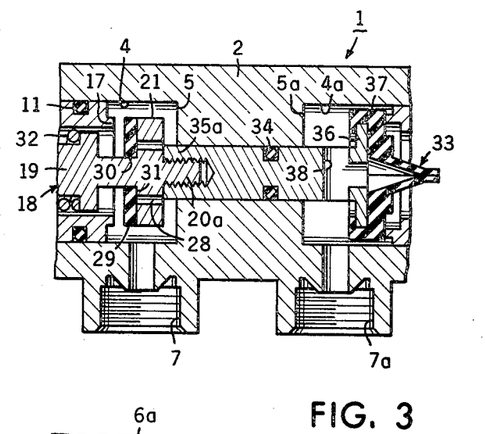
FIGS. 3 and 4 are fragmentary sectional views taken from FIG. 1 illustrating alternate constructions in cross-section also embodied in the present invention.

In FIG. 3, an alternative construction for the control valve 1 is shown merely to illustrate that the proportioning and metering pistons 18, 33 can be, if desired, a unitary construction without altering the operational features or characteristics of said control valve wherein the metering piston 18 extends through the housing bore 3 having its leftward free end 35a extending coaxially into the housing counterbore 4. In this alternative construction, the portion of the proportioning piston 18 rightward of the flange 21 thereof is defined by a threaded extension 20a which is threadedly received in the free end 35a.

Figure 4:
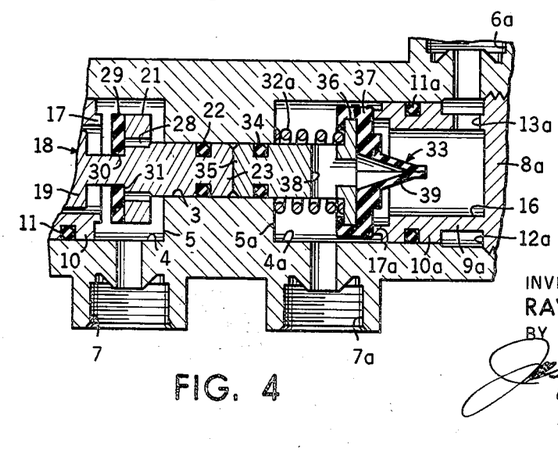

In FIG. 4, another alternative construction for the control valve 1 is shown merely to illustrate that a proportioning or metering spring 32a can be biased between the housing shoulder 5 and the metering piston flange 36 in place of the metering spring 32 hereinbefore described either in the separate or unitary constructions of the proportioning and metering pistons 18, 33 respectively shown in FIGS. 1 and 3 without altering the operational features or characteristics of said control valve. In other words, the separate proportioning and metering pistons 18, 33 are resiliently urged by the spring 32a since said pistons are in abutment during the operation of the control valve 1 and both of said pistons are responsive to the compressive force of said spring.

Figure 5:
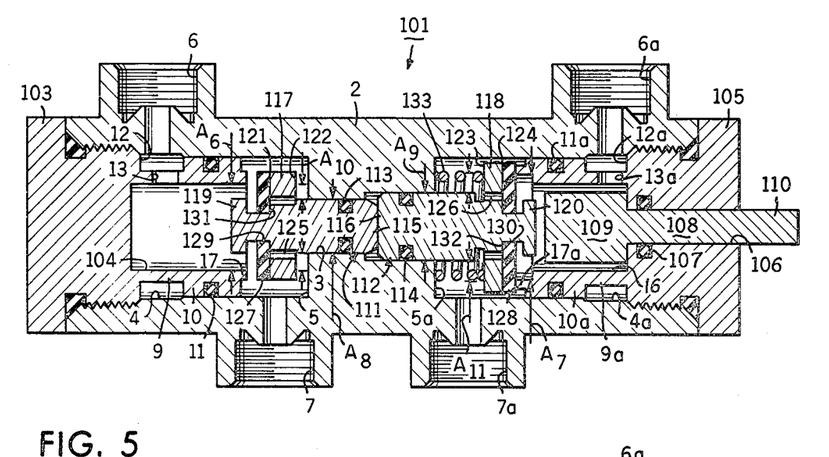
FIG. 5 is a sectional view showing another control valve embodying the present invention in cross-section.

Referring now to FIG. 5, another control valve 101 is shown having substantially the same component parts and functioning in substantially the same manner as the previously described control valve 1 with the following exceptions.

In the control valve 101, a stepped bore 102 is provided in the housing 2 between the bore 3 and the counterbore 4a, and a closure member 103 is threadedly received in the open end of the housing counterbore 4 having a blind bore 104 extending axially into the flange 10 and extension 9 to connect with the peripheral groove 12 and passage 13 thereof. Another closure member 105 is threadedly received in the open end of the housing counterbore 4a, and a stepped bore 106 having a seal 107 disposed therein is provided through said closure member connecting with the bore 16 thereof. A disabling member or piston 108 is slidably received in the stepped bore 107 in sealing engagement with the seal 106 having an enlarged leftward or abutment end 109 extending into the bore 16 and a rightward or force receiving end 110 extending exteriorly of the closure member 105.

Opposed resiliently urged members, such as the proportioning and metering pistons indicated generally at 111 and 112, are slidably received in the housing stepped bore 102 and housing bore 3 having peripheral seals 113, 114 therein for sealing engagement with said housing stepped bore and housing bore and opposed abutment ends 115, 116 thereon, respectively. The pistons 111, 112 extend coaxially into the housing counterbores 4, 4a having radially extending flanges 117, 118 thereon adjacent to the other opposed ends 119, 120 thereof. The flanges 117, 118 are respectively provided with opposed annular faces or sides 121, 122 and 123, 124, and a plurality of return flow passages 125, 126 are axially provided through said flanges between said opposed faces thereof. Valve members or elements 127, 128 are provided in engagement with the faces 121, 124 of the flanges 117, 118 for engagement with the valve seats 17, 17a, and central apertures 129, 130 in said valve members are slidably received on the piston end portions 119, 120, said valve members having radially inner portions 131, 132 defining unidirectional flow or check valves for sealing engagement with the flange 121, 124 about the passages 125, 126, respectively. A metering or proportioning spring 133 is engaged between the housing shoulder 5a and the flange face 123 of the metering piston 112 urging the seal 128 into sealing engagement with the valve seat 17a.

The pistons 111, 112 are provided with effective areas $A_6$, $A_7$ which are substantially defined by the seating engagement of the valve members 127, 128 with the valve seats 17, 17a and subjected to the fluid pressures at the inlet ports 6, 6a, and other effective areas $A_8$, $A_9$ are also defined said piston substantially defined by the sealing engagements of the seals 113, 114 with the housing bore and stepped bore 3, 102, respectively. The difference between areas $A_6$ and $A_8$ and between $A_7$ and $A_9$ defines other areas $A_{10}$ and $A_{11}$ on the pistons 111, 112 which are subjected to the fluid pressure at the outlet ports 7, 7a, and opposed to the areas $A_6$, $A_7$, respectively. To complete the description of the control valve 101, it should be noted that the areas $A_7$, $A_9$ and $A_{11}$ of the metering piston 112 are predeterminately greater than the corresponding areas $A_6$, $A_8$ and $A_{10}$ of the proportioning piston 111.

In the operation with the component parts of the control valve 101 positioned as shown in FIG. 3 and as described hereinabove, separate and substantially equal input or supplied fluid pressures $P_1$, $P_2$ are supplied by the split system master cylinder (not shown) to the inlet ports 6, 6a, respectively. The fluid pressure $P_1$ flows from the inlet port 6 through the peripheral groove 12, the passage 13 and the bore 104 of the closure member 103 and the housing counterbore 4 to establish an output fluid pressure $P_3$ at the outlet port 7 which is effective to actuate the vehicle rear brake motors (not shown). The input fluid pressure $P_1$ acts on the effective area $A_8$ of the proportioning piston 111 to establish a force $P_1A_8$ urging the abutment end 115 thereof into driving engagement with the abutment end 116 of the metering piston 112 assist the compressive force $Fs$ of the spring 123 urging the valve member 128 into sealing engagement with the valve seat 17a and at the same time urging the valve member 127 from engagement with the valve seat 17. In this manner, open pressure fluid communication was established between the inlet and outlet ports 6, 7 so that the magnitudes of the input and output fluid pressures $P_1$, $P_3$ are substantially equal, as shown along the line OC in the graph of FIG. 2.

At the same time, the input fluid pressure $P_2$ flows from the inlet port 6a through the peripheral groove 12a and passage 13a of the closure member 105 into the bore 16 thereof acting on the area $A_7$ of the metering piston 112 to establish an input force $P_2A_7$ which concertedly urges the metering and proportioning pistons 112, 111 leftwardly against the spring force $Fs$ and the input force $P_1A_8$; however, the additive input force $P_1A_8$ and the spring force $Fs$ obviates such concerted movement of said proportioning and metering pistons to impede pressure fluid communication between the inlet and outlet ports 6, 6a until the magnitude of the input fluid pressure $P_2$ attains the predetermined value B, as shown along the line OB in the graph of FIG. 2. When the input fluid pressure $P_2$ is increased to the predetermined value B, the input force $P_2A_7$ is correspondingly increased to overcome the opposing additive input force $P_1A_8$ and spring force $Fs$ and concertedly move the metering and proportioning pistons 112, 111 leftwardly toward a metering position of said metering piston disengaging the valve member 128 from the valve seat 17a to establish metered pressure fluid communication between the inlet and outlet ports 6a, 7a wherein the input fluid pressure $P_2$ flows from the closure member bore 16 through the housing counterbore 4a to establish a metered output fluid pressure $P_4$ at said outlet port. The established output fluid pressure $P_4$ at the outlet port 7a acts on the area $A_{11}$ of the metering piston 112 to establish an output force $P_4A_{11}$ which is additive to the input force $P_1A_8$ and the spring force $Fs$ and in opposition to the input force $P_2A_7$. When the additive input and output forces $P_1A_8$ and $P_4A_{11}$ and the spring force $Fs$ attain a value substantially equal to that of the input force $P_2A_7$, the metering piston 112 is urged from its metering position to re-engage the valve member 128 with the valve seat 17a and again interrupt pressure fluid communication between the inlet and outlet ports 6a, 7a. In this manner, the output fluid pressure $P_4$ is established in a predetermined ratio with the input fluid pressure $P_2$ in excess of the predetermined value B according to the following formula:

$$P_4 = \frac{P_2 A_{11} - Fs - P_1 A_8}{A_{11}}$$

Of course, the metering piston 112 functions as described hereinabove to establish corresponding metered proportional values of the output fluid pressure $P_4$ in response to further increases in the magnitude of the input fluid pressure $P_2$ in excess of the predetermined value B, as shown along the line BC in the graph of FIG. 2, and when the magnitude of the input fluid pressure $P_2$ attains the predetermined value C, the input force $P_2 A_7$ overcomes the additive input and output forces $P_1 A_8$, $P_4 A_{11}$ and the spring force Fs to concertedly move the proportioning and metering pistons 111, 112 leftwardly toward a non-metering or open position of said metering piston wherein the valve member 128 is disengaged from the valve seat 17a to establish open or unmetered pressure fluid communication between the inlet and outlet ports 6a, 7a. When the metering piston 112 is in its non-metering position, the magnitudes of the input and output fluid pressures $P_2$, $P_4$ in excess of the predetermined value C are substantially equal, as shown along the line CD in the graph of FIG. 2, and the magnitude of the input fluid pressure $P_2$ in excess of the predetermined value B acts on the smaller input area $A_9$ to establish an input or holding force $P_2 A_9$ for maintaining said metering piston in its non-metering position, said holding force $P_2 A_9$ replacing the input and output forces $P_2 A_7$ and $P_4 A_{11}$.

When the metering piston 112 is moved to its non-metering position as described above, the proportioning piston 111 is, of course, concertedly movable leftwardly therewith in response to the input force $P_2 A_9$ and against the spring force Fs and input force $P_1 A_8$ to engage the valve member 127 with the valve seat 17 isolating the fluid pressure $P_1$ at the inlet port 6 from the established or applied fluid pressure $P_3$ at the outlet port 7 interrupting pressure fluid communication therebetween, and upon engagement of said valve member with said valve seat, the magnitudes of the input fluid pressures $P_1$, $P_2$ and the output fluid pressures $P_3$, $P_4$ are substantially equal, having attained the predetermined value C, as shown in the graph of FIG. 2. With the valve member 127 so engaged with the valve seat 17, the input force $P_1 A_8$ is replaced by opposing input and output forces $P_1 A_6$ and $P_3 A_{10}$, respectively, established by the input and output fluid pressures $P_1$, $P_3$ acting on the opposed areas $A_6$, $A_{10}$ of the proportioning piston 111. The output force $P_3 A_{10}$ is additive to the input force $P_2 A_9$ and the input force $P_1 P_6$ is additive to the spring force Fs. In view of the foregoing, it is apparent that the additive input and output forces $P_2 A_9$ and $P_3 A_{10}$ will maintain the valve member 127 engaged with the valve seat 17 against the opposing additive input and spring forces $P_1 A_6$ and Fs when the magnitude of the input fluid pressures $P_1$, $P_2$ and the output fluid pressures $P_3$, $P_4$ are at the predetermined value C.

When the input fluid pressures $P_1$, $P_2$ are increased along the line OD in the graph of FIG. 2 to a value in excess of the predetermined value C, the opposed input forces $P_1 A_6$ and $P_2 A_9$ are correspondingly increased and the increased input force $P_1 A_6$ assisted by the spring force Fs concertedly urges the proportioning and metering pistons 111, 112 rightwardly against the increased input force $P_2 A_9$ and the output force $P_3 A_{10}$ toward a proportioning or metering position of said proportioning piston disengaging the valve member 127 from the valve seat 17; however, when said proportioning piston is in its metering position, it should be noted that the input force $P_2 A_9$ is effective to maintain said metering piston in its non-metering position with the valve member 128 disengaged from the valve seat 17a to maintain open pressure fluid communication between the inlet and outlet ports 6a, 7a. When the proportioning piston 111 is in its metering position, metered pressure fluid communication is established between the inlet and outlet ports 6, 7 effecting a proportional increase in the output fluid pressure $P_3$ along the line CE in the graph of FIG. 2 in the following ratio:

$$P_3 = \frac{Fs + P_1 A_6 - P_2 A_9}{A_{10}}$$

The proportional increase in the output fluid pressure $P_3$ effects a corresponding increase in the output force $P_3 A_{10}$, and when the additive increased input and output forces $P_2 A_9$ and $P_3 A_{10}$ attain a value somewhat greater than the opposing input and spring forces $P_1 A_6$ and Fs, the metering and proportioning pistons 112, 111 are again concertedly moved leftwardly to the isolating position of said proportioning piston re-engaging the valve member 127 with the valve seat 17 and again interrupting pressure fluid communication between the inlet and outlet ports 6, 7. If the input fluid pressures $P_1$, $P_2$ are further increased, the component parts of the control valve 101 function in the same manner as previously described hereinabove to effect further proportional increases in the output fluid pressure $P_3$.

When the desired braking effort is attained, the split master cylinder is de-actuated to eliminate the input fluid pressures $P_1$, $P_2$, and when the input fluid pressures $P_1$, $P_2$ are so decreased along the line OD in the graph of FIG. 2 below the value of the output fluid pressure $P_3$ on the line GE of said graph, a fluid pressure is established across the valve member 127 when the proportioning piston 111 is in its isolating position acting to displace the uni-directional valve portion 131 of said valve member from engagement with the leftward face 121 of the proportioning piston flange 117 thereby permitting the return flow of the displaced output fluid pressure $P_3$ through the return flow passages 125 and the valve member central aperture 129 to the inlet port 6. This return flow of the displaced output fluid pressure $P_3$ when the valve member 127 is engaged with the valve seat 17 is illustrated along the line EGC in the graph of FIG. 2, and since the metering piston 112 is in its non-metering position, the output fluid pressure $P_4$ is, of course, reduced along the line DC of said graph with the input fluid pressures $P_1$, $P_2$. When the input fluid pressures $P_1$, $P_2$ and the output fluid pressures $P_3$, $P_4$ are so reduced to a value less than the predetermined value C, the input force $P_1 A_6$ assisted by the spring force Fs overcomes the opposing additive input and output forces $P_2 A_9$ and $P_3 A_{10}$ to concertedly move the proportioning and metering pistons 111, 112 from their respective isolating and non-metering positions to their original positions wherein the valve member 127 is disengaged from the valve seat 17 re-establishing open pressure fluid communication between the inlet and outlet ports 6, 7 and wherein the valve member 128 is re-engaged with the valve seat 17a to again interrupt pressure fluid communication between the inlet and outlet ports 6a, 7a. However, when the valve member 128 is re-engaged with the valve seat 17a and the input fluid pressure $P_2$ is further reduced below the value of the output fluid pressure $P_4$, a fluid pressure differential is then established across said valve member acting to displace the uni-directional valve portion 132 thereof from sealing engagement with the rightward face 124 of the metering piston flange 118 thereby permitting the return flow of the displaced output fluid pressure $P_4$ through the return flow passages 126 and the valve member central aperture 130 to the inlet port 6a.

As mentioned hereinbefore, it is desirable to obviate the proportioning function of the control valve 101 in order to insure delivery of the maximum input fluid pressure $P_1$ to the outlet port 7 which is applied to the vehicle rear brake motors (not shown). Under emergency vehicle operating conditions, in the event of the failure of the input fluid pressure $P_2$ which is applied to the vehicle rear brake motors (not shown). Under emergency vehicle operating conditions, in the event of the failure of the input fluid pressure $P_2$ which is applied to the vehicle front brake motors (not shown), when the proportioning and metering pistons 111, 112 are in their respective isolating and non-metering positions, the input fluid pressures $P_1$, $P_2$ and output fluid pressures $P_3$, $P_4$ have magnitudes equal to or in excess of the predetermined value C; therefore, in the event of the failure of the input fluid pressure $P_2$, the input or holding force $P_2A_9$ is eliminated. Upon such elimination of the input force $P_2A_9$, the output force $P_3A_{10}$ is, of course, overcome by the opposing additive input and spring forces $P_1A_6$ and Fs to immediately effect the concerted movement of the proportioning and metering pistons 111, 112 from their isolating and non-metering positions to their respective inoperative positions to effect open pressure fluid communication between the inlet and outlet ports 6, 7 and obviate the proportioning function of said proportioning piston under such emergency vehicle operating conditions. In this manner, when the proportioning function of the control valve 1 is obviated, unimpeded or non-proportioned flow of the maximum available input fluid pressure $P_1$ at the inlet port 6 is effected through the peripheral groove 12, the passage 13, and the bore 104 of the closure member 103 past the disabled or by-passed valve element 127, which is maintained open in response to the spring force and the input force $P_1A_8$ urging the proportioning and metering pistons 111, 112 toward their inoperative positions, and therefrom through the housing counterbore 4 to the outlet port 7.

Of course, it is desirable to bleed the vehicle split braking system (not shown) in which the control valve 101 is utilized at a fluid pressure having a magnitude less than the predetermined value B, which as described hereinbefore is the value of the input fluid pressure $P_2$ necessary to effect the metering function of the metering piston 112; therefore, a manually applied force on the external end 110 of the disabling member 108 drivingly engages the internal end 109 thereof with the rightward end portion 120 of said metering piston and drives said metering piston against the spring 123 to contain the force thereof and displace the valve member 128 from the valve seat 17a. With the force of the spring 123 so contained between the housing shoulder 5a and the metering piston 112 and with the valve member 128 disengaged from the valve seat 17, it is obvious that open pressure fluid communication between the inlet and outlet ports 6a, 7a is provided for bleeding purposes at relatively low pressures less than the predetermined value B.

Figure 6:
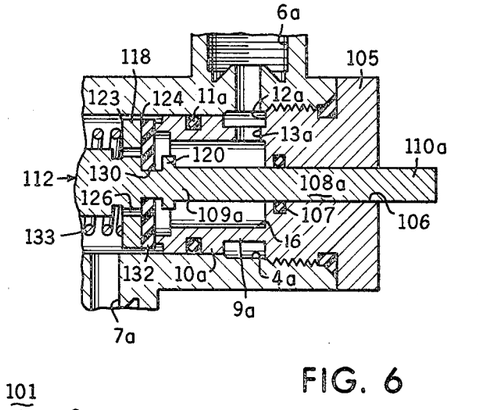
FIGS. 6 and 7 are fragmentary sectional views taken from FIG. 5 illustrating alternate constructions in cross-section also embodied in the present invention.

In FIG. 6, an alternative construction for the control valve 101 is shown wherein a disabling member 108a is slidably received in the bore 107 of the closure member 105 in sealing engagement with the seal 106, said disabling member having an interior end 109a integrally connected with the rightward end portion 120 of the metering piston 112 and an exterior or force receiving end 110a extending exteriorly of the closure member 105.

Figure 7:
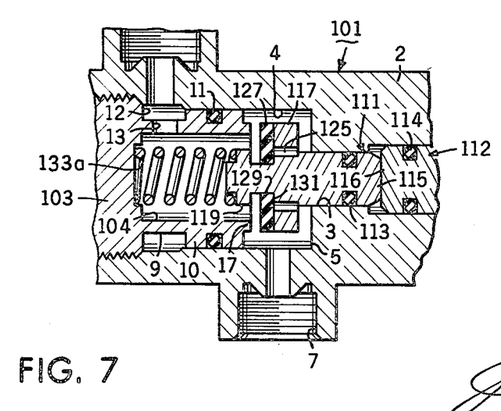

In FIG. 7, another alternative construction for the control valve 101 is shown merely to illustrate that a proportioning or metering spring 32a can be biased between the end wall of the bore 104 of the closure member 103 and the end portion 119 of the proportioning piston 111 in place of the metering spring 123 hereinbefore described without altering the operational features or characteristics of said control valve. In other words, the proportioning and metering pistons 111, 112 are resiliently urged by either the spring 123 or the spring 123a respectively shown in FIGS. 5 and 7 since said pistons are in abutment during the operation of the control valve 101 and both of said pistons are responsive to the compressive force of said springs. Further, it is obvious that the pistons 111, 112 could be of a unitary construction, if desired.

From the foregoing, novel control valves 1, 101 meeting the specific objects set out hereinbefore, as well as other objects and advantageous features apparent from the descriptions and operations thereof, are provided, and that changes or modifications as to the precise configurations, shapes and details of the constructions set forth in this disclosure by way of illustration may be made by those skilled in the art without departing from the spirit of the invention.

The embodiments of the invention in which an exclusive property or privilege is claimed are defined as follows:

1. A control valve comprising a housing, resiliently urged means movable in said housing for controlling the respective applications through said housing of separate substantially equal fluid pressures supplied thereto including first means initially movable against the force of said resiliently urged means in response to one of the supplied fluid pressures in excess of a predetermined value from a position in said housing isolating the one supplied fluid pressure to effect a metered application thereof through said housing and further movable against the force of said resiliently urged means toward a non-metering position in said housing establishing open pressure fluid communication between the one supplied and applied fluid pressures when the magnitude of the one supplied fluid pressure exceeds another predetermined value greater than the first named predetermined value, and second means concertedly movable with said first means upon movement thereof to its non-metering position toward a position isolating the other of the applied fluid pressures from the other of the supplied fluid pressures, said second means being movable against increases in the one supplied fluid pressure in excess of the other predetermined value acting on said first means in response to corresponding increases in the other supplied fluid pressure in excess of the other predetermined value and assisted by the force of said resiliently urged means to effect a metered increase in the other applied fluid pressure in a predetermined ratio with the increased other supplied fluid pressure in excess of the other predetermined value.

2. The control valve according to claim 1, wherein said resiliently urged means also includes resilient means engaged with one of said first and second means to oppose movement thereof toward their respective non-metering and isolating positions.

3. The control valve according to claim 2, comprising a disabling portion on said one of said first and second means extending exteriorly of said housing, said one of said first and second means being movable toward a position containing the force of said resilient means to effect open pressure fluid communication between the one supplied and applied fluid pressures at magnitudes thereof less than the first named predetermined value in response to an externally applied force on said disabling portion.

4. The control valve according to claim 2, comprising disabling means movable in said housing for driving engagement with said second means and having a force receiving portion extending exteriorly of said housing, said disabling means being movable in response to an externally applied force on said portion into driving engagement with said second means to move said second means toward a position containing the force of said resilient means and effecting open pressure fluid communication between the one supplied and applied fluid pressures at magnitudes thereof less than the first named predetermined value.

5. The control valve according to claim 1, wherein said resiliently urged means includes resilient means engaged with said second means and opposing the concerted movement of said first and second means toward their respective non-metering and isolating positions, said resilient means also urging said second means toward an inoperative position in said housing establishing open pressure fluid communication between the other supplied and applied fluid pressures in the event of the failure of the one supplied fluid pressure.

6. The control valve according to claim 1, wherein said resiliently urged means includes resilient means engaged with said first means and opposing movement thereof toward its non-metering position, said second means being movable from its isolating position in response to an increase in the magnitude of the other supplied fluid pressure in excess of that of the isolated applied fluid pressure toward an inoperative position in said housing establishing open pressure fluid communication between the other supplied and applied fluid pressures in the event of the failure of the one supplied fluid pressure.

7. The control valve according to claim 1, comprising passage means in one of said first and second means for the return flow of one of the one and other applied fluid pressures therethrough when said one of said first and second means is in one of its positions interrupting pressure fluid communication between one of the one and other supplied fluid pressures and the one of the one and other applied fluid pressures, and unidirectional valve means controlling said passage means and respectively subjected to the one of the one and other supplied fluid pressures and the one of the one and other applied fluid pressures, said uni-directional valve means being movable only in response to the magnitude of the one of the one and other applied fluid pressures in excess of that of the one of the one and other supplied fluid pressures respectively acting thereon toward a position opening said passage means to effect only the return flow therethrough of the one of the one and other applied fluid pressures.

8. The control valve according to claim 2, comprising first opposed differential areas on said first means respectively subjected to the one supplied and applied fluid pressures, said first means being movable against the force of said resilient means toward a position in said housing in response to the one supplied fluid pressure in excess of the first named predetermined value and less than the other predetermined value acting on one of said first areas to establish the metered one applied fluid pressure acting on the other of said first areas and also movable against the force of said resilient means toward its non-metering position in response to the one supplied fluid pressure in excess of the other predetermined value acting on the difference between said one and other first areas.

9. The control valve according to claim 8, wherein said one first area is greater than said other first area.

10. The control valve according to claim 8, comprising a valve seat on said housing for engagement with said first means, said first means being normally urged into engagement with said valve seat to isolate the one supplied fluid pressure and being urged toward its metering and non-metering positions disengaged from said valve seat in response to the magnitudes of the one supplied fluid pressure in excess of said first named and other predetermined values acting on said one first area and on the difference between said one and other first areas, respectively.

11. The control valve according to claim 10, comprising valve means on said first means for engagement with said valve seat, said valve means being engaged with said valve seat when said first means is in its position isolating the one supplied fluid pressure and said valve means being disengaged from said valve seat upon movement of said first means toward its metering and non-metering positions.

12. The control valve according to claim 11, comprising a portion on said first means opposite to said valve means and movable in said housing in abutting engagement with said second means, said portion having an effective area substantially equal to the difference between said one and other first areas.

13. The control valve according to claim 11, comprising passage means in said first means for connection between the one supplied and applied fluid pressures when said valve means is engaged with said valve seat, and said valve means including a portion defining uni-directional valve means respectively subjected to the one supplied and applied fluid presusres and controlling said passage means, said uni-directional valve means being movable only in response to the magnitude of the one applied fluid pressure in excess of that of the one supplied fluid pressure respectively acting thereon toward a position opening said passage means and establishing only the return flow therethrough of the one applied fluid pressure.

14. The control valve according to claim 2, comprising second opposed areas on said second means for respective subjection to the other supplied and applied fluid pressures, second means being movable from its isolating position in response to the increased other supplied fluid pressure in excess of the other predetermined value acting on one of said second areas and assisted by the force of said resilient means against the other applied fluid pressure acting on the other of said second areas and the one supplied fluid pressure acting on said first means when said first means is in its non-metering position to effect the metered increase in the other applied fluid pressure in excess of the other predetermined value.

15. The control valve according to claim 14, wherein said one and other second areas are substantially equal.

16. The control valve according to claim 14, wherein said one second area is predeterminately greater than said other second area.

17. The control valve according to claim 1, comprising a valve seat on said housing for engagement with said second means, said second means being movable into engagement with said valve seat in its isolating position and being movable toward its metering position disengaged from said valve seat.

18. The control valve according to claim 17, comprising valve means on said second means for engagement with said valve seat, said valve means being engaged with said valve seat when said second means is in its isolating position and said valve means being disengaged from said valve seat upon movement of said second means toward its metering position.

19. The control valve according to claim 18, comprising another portion on said second means opposite to said valve means and movable in said housing in abutting engagement with said first means.

20. The control valve according to claim 18, comprising passage means in said second means for connection between the other supplied and applied fluid pressures when said valve means is engaged with said valve seat, said valve means including a portion defining uni-directional valve means respectively subjected to the other supplied and applied fluid pressures and controlling said passage means, said uni-directional valve means being movable only in response to the magnitude of the other applied fluid pressure in excess of that of the one supplied fluid pressure respectively acting thereon toward a position opening said passage means to permit only the return flow therethrough of the other applied fluid pressure.

21. The control valve according to claim 8, comprising second opposed areas on said second means for respective subjection to the other supplied and applied fluid pressures, said second means being movable toward its isolating position in response to the movement of said first means toward its non-metering position, and said second means being thereafter further movable toward its metering position in response to the increased other supplied fluid pressure in excess of the other predetermined value acting on one of said second areas and assisted by the force of said resilient means to effect the metered increase in the other applied fluid pressure in excess of the other predetermined value acting on the other of said second areas against the one supplied fluid pressure acting on the difference between said one and other first areas when said first means is in its non-metering position.

22. The control valve according to claim 21, wherein said one first area is greater than said other first area and said one and other second areas are substantially equal.

23. The control valve according to claim 21, wherein said one first area and said one second area are predeterminately greater than said other first area and said other second area, respectively.

24. The control valve according to claim 2, comprising first and second valve seats on said housing for respective engagement with said first and second means, said first means being normally urged into engagement with said first valve seat in its isolating position and being disengaged therefrom upon movement to its metering and non-metering positions, and said second means being normally urged toward an inoperative position disengaged from said second valve seat to establish open pressure fluid communication between the other supplied and applied fluid pressures, said second means being movable into engagement with said second valve seat in its isolating position and also movable toward its metering position disengaged from said second valve seat.

25. The control valve according to claim 24, comprising first and second valve means on said first and second means for respective engagement with said first and second valve seats, said first valve means being engaged with said first valve seat when said first means is in its isolating position and disengaged therefrom when said first means is in its metering and non-metering positions, said second valve means being engaged with said second valve seat when said second means is in its isolating position and disengaged therefrom when said second means is in its inoperative and metering positions.

26. The control valve according to claim 25, comprising first and second passages in said first and second means for the return flow of the one and other applied fluid pressures therethrough when said first and second valve means are engaged with said first and second valve seats, and first and second portions on said first and second valve means normally responsive to the one and other supplied fluid pressures acting thereon in opposition to the one and other applied fluid pressures to close said first and second passage means when said first and second valve means are engaged with said first and second valve seats and said first and second portions being movable only in response to the magnitudes of the one and other applied fluid pressures in excess of those of the one and other supplied fluid pressures acting thereon toward positions opening said first and second passage means to permit only the return flow therethrough of the one and other applied fluid pressures, respectively.

27. The control valve according to claim 25, comprising first and second flow passages in said housing for the respective applications therethrough of the supplied fluid pressures, said first and second valve seats being defined on said housing about said first and second flow passages, said first means including a first piston movable in said first flow passage and having a first end movable in said housing, and said first valve means being disposed on said first piston and normally urged into engagement with said first valve seat, and said second means including a second piston movable in said second flow passage and having a second end movable in said housing in abutting engagement with said one first end, and said second valve means beig disposed on said second piston and normally disengaged from said second valve seat.

28. The control valve according to claim 27, comprising a third end on said first piston movable in said housing and opposed to said first end including a force receiving portion exteriorly of said housing, said first and second pistons being concertedly movable against the force of said resilient means to disengage said first valve means from said first valve seat and effect open pressure fluid communication between the one supplied and applied fluid pressures at magnitudes thereof less than the first named predetermined value in response to a manually applied force on said force receiving portion.

29. The control valve according to claim 27, comprising a third piston movable in said housing for driving engagement with said first piston and having a force receiving portion extending exteriorly of said housing, said third piston being movable in response to a manually applied force on said force receiving portion to engage said first piston and concertedly drive said first and second pistons against the force of said resilient means to disengage said first valve means from said first valve seat and effect open pressure fluid communication between the one supplied and applied fluid pressures at magnitudes thereof less than the first named predetermined value.

30. The control valve according to claim 27, comprising a third end on said second piston movable in said housing and opposed to said second end including a force receiving portion extending exteriorly of said housing, said resilient means being engaged between said housing and said second piston, said second piston being movable against said resilient means to contain the force thereof in response to a manually applied force on said force receiving portion, and said first piston being movable to disengage said first valve means from said first valve seat and effect open pressure fluid communication between the one supplied and applied fluid pressures at magnitudes thereof less than the first named predetermined value when the force of said resilient means is manually contained.

31. The control valve according to claim 27, comprising a bore in said housing interposed between first and second counterbores, said first and seconds ends of said first and second pistons being slidable in said bore and said first and second pistons respectively extending coaxially into said first and second counterbores, first and second shoulders on said housing at the junctures of said bore with said first and second counterbores, respectively, first and second outlet ports in said housing intersecting said first and second counterbores adjacent to said first and second shoulders, first and second closure members removably secured to said housing and respectively defining end walls of said first and second counterbores spaced from said first and second shoulders, first and second inlet ports in said housing intersecting with said first and second counterbores adjacent to said first and second closure members, first and second extension means on said first and second closure members extending into said first and second counterbores, first and second free end portions on first and second extension means sealably engaged with said first and second counterbores between said first and second inlet and outlet ports, respectively, said first and second valve seats being defined on said first and second end portions and facing said first and second shoulders for engagement with said first and second valve means, first an second passages in said first and second extension means having one of the ends thereof connected in pressure fluid communication with said first and second inlet ports and the other of the ends thereof extending through said first and second valve seats, said first and second passages and said portions of said first and second counterbores between said first and second shoulders and said first and second free end portions defining said first and second flow passages, respectively.

32. A control valve comprising a housing having a pair of port sets therein, each port set including inlet and outlet ports for respective connection with one of the fluid pressure generating portions of a split master cylinder and a brake motor, a pair of valve members controlling pressure fluid communication between said port sets, one of said valve members being initially movable in response to fluid pressure at the inlet port of one of said port sets in excess of a predetermined value toward a metering position to establish a metered fluid pressure at the outlet port of said one port set and being thereafter further movable in response to fluid pressure at the inlet port of said one port set in excess of another predetermined value greater than the first named predetermined value toward a non-metering position establishing open pressure fluid communication between the inlet and outlet ports of said one port set, resilient means engaged with one of said one valve member and the other of said valve members and opposing movement of said one valve member toward its metering and non-metering positions, said other valve member being concertedly movable with said one valve member upon movement thereof to its non-metering position toward a position interrupting pressure fluid communication between the inlet and outlet ports of the other of said port sets, and said other valve member being movable against increases in the fluid pressure at the inlet port of said one port set in excess of the other predetermined value acting on said one valve member in response to substantially corresponding increases in the fluid pressure at the inlet port of said other port set in excess of the other predetermined value and assisted by said resilient means to effect a metered increase in the established fluid pressure at the outlet port of said other port set in a predetermined ratio with the increased fluid pressure at the inlet port of said other port set in excess of the other predetermined value.

33. A control valve comprising a housing having a pair of port sets therein, each port set including inlet and outlet ports for respective connection with a split master cylinder and a brake motor, means movable in said housing including a pair of valve members controlling pressure fluid communication between the inlet and outlet ports of said port sets, respectively, resilient means engaged with said means normally urging one of said valve members toward a position interrupting pressure fluid communication between the inlet and outlet ports of one of said port sets and urging the other of said members toward a position establishing pressure fluid communication between the inlet and outlet ports of the other of said port sets, said one valve member being movable against said resilient means toward a position establishing metered pressure fluid communication between the inlet and outlet ports of said one port set when the fluid pressures at the inlet ports of said port sets attain a predetermined value and being further movable against said resilient means toward a non-metering position establishing open pressure fluid communication between the inlet and outlet ports of said one port set when the fluid pressures at the inlet ports of said port sets attain another predetermined value in excess of the first named predetermined value, said second valve member being movable in response to the movement of said first valve member to its non-metering position toward a position interrupting pressure fluid communication between the inlet and outlet ports of the other of said port sets when the respective fluid pressures thereat are substantially equal to the other predetermined value, and said other valve member being further movable against increases in the fluid pressure at the inlet port of said one port set in excess of the other predetermined value acting on said first valve member in response to corresponding increases in the fluid pressure at the inlet port of said other port set in excess of the other predetermined value and assisted by said resilient means to effect a metered increase in the established fluid pressure at the outlet port of said other port set in a predetermined ratio with the increased fluid pressure at the inlet port of said other port set in excess of the other predetermined value.

34. The control valve according to claim 32, comprising a force receiving portion on one of said one and other valve members extending exteriorly of said housing, said one of said one and other valve members being movable in response to an externally applied force on said force receiving portion toward a position containing the force of said resilient means to effect open pressure fluid communication between the inlet and outlet ports of said one port set when the fluid pressure at the inlet port of said one port set is less than the first named predetermined value.

35. The control valve according to claim 32, wherein said resilient means comprises a spring biased between said housing and said other valve member and opposing the concerted movement of said one and other valve members, said spring also urging said other valve member toward an inoperative position in said housing establishing open pressure fluid communication between the inlet and outlet ports of said other port set in the event of a failure of the fluid pressure at the inlet port of said one port set.

36. The control valve according to claim 32, wherein said resilient means comprises a spring biased between said housing and said one valve member and opposing movement thereof toward its non-metering position, said other valve member being movable from its position interrupting pressure fluid communication between the inlet and outlet ports of said other port set in response to an increase in the fluid pressure at the inlet port of said other port set in excess of that at the outlet port of said other port set toward an inoperative position in said housing establishing open pressure fluid communication between the inlet and outlet ports of said other port set in the event of the failure of the fluid pressure at the inlet port of said one port set.

37. The control valve according to claim 32, comprising passage means in one of said one and other valve members for the return flow of fluid pressure at the outlet port of one of said one and other port sets therethrough when said one of said one and other valve members is in its position interrupting pressure fluid communication between the inlet and outlet ports of said one of said one and other port sets, and uni-directional valve means respectively subjected to the fluid pressures at the inlet and outlet ports of said one of said one and other port sets controlling said passage means, said uni-directional valve means being movable only in response to the fluid pressure at the outlet port of said one of said one and other port sets in excess of that at the inlet port of said one of said one and other port sets acting thereon toward a position opening said passage means to effect only the return flow therethrough of the fluid pressure at the outlet port of said one of said one and other port sets.

38. The control valve according to claim 32, comprising opposed differential areas on said one valve member respectively subjected to the fluid pressure at the inlet and outlet ports of said one port set, said one valve member being movable against said resilient means toward its metering position in response to the fluid pressure at the inlet port of said one port set in excess of the first named predetermined value and less than the other predetermined value acting on one of said areas to establish the metered fluid pressure at the outlet port of said one port set acting on the other of said areas and said one valve member also being further movable against said resilient means toward its non-metering position in response to the fluid pressure at the inlet port of said one port set in excess of the other predetermined value acting on the difference between said one and other areas.

39. The control valve according to claim 38, wherein said one area is greater than said other area.

40. The control valve according to claim 38, comprising a valve seat on said housing between the inlet and outlet ports of said one port set, said one valve member being normally urged into engagement with said valve seat to interrupt pressure fluid communication between the inlet and outlet ports of said one port set when the fluid pressure at the inlet port of said one port set is less than the first named predetermined value and being urged toward its metering and non-metering positions in response to the fluid pressure at the inlet port of said one port set in excess of the first named and other predetermined values acting on said one area and the difference between said one and other areas, respectively.

41. The control valve according to claim 40, comprising valve means on said one valve member for engagement with said valve seat, said valve means being engaged with said valve seat when said one valve member is in its pressure fluid interrupting position and disengaged from said valve seat upon movement of said one valve member toward its metering and non-metering positions.

42. The control valve according to claim 41, comprising a portion on said one valve member opposite to said valve means and movable in said housing in abutting engagement with said other valve member, said portion having an effective area substantially equal to the difference between said one and other areas.

43. The control valve according to claim 41, comprising passage means in said one valve member for connection between the inlet and outlet ports of said one port set when said valve means is engaged with said valve seat, and said valve means including a portion defining uni-directional valve means for respective subjection to the fluid pressures at the inlet and outlet ports of said one port set and controlling said passage means, said uni-directional valve means being responsive to the magnitude of the fluid pressure at the outlet port of said one port set in excess of that of the fluid pressure at the inlet port of said one port set respectively acting thereon to establish only the return flow of the fluid pressure at the outlet port of said one port set through said passage means.

44. The control valve according to claim 32, comprising a valve seat on said housing between the inlet and outlet ports of said other port set, said other valve member being normally disengaged from said valve seat to establish open pressure fluid communication between the inlet and outlet ports of said other port sets and being movable toward its interrupting position into engagement with said valve seat in response to the movement of said one valve member toward its non-metering position, and said one valve member also being thereafter movable toward its metering position in response to the increased fluid pressure in excess of the other predetermined value at the inlet port of said other port set.

45. The control valve according to claim 32, comprising opposed areas on said other valve member for respective subjection to the fluid pressure at the inlet and outlet ports of said other port set, said other valve member being movable from its interrupting position in response to the force of said resilient means and the increased fluid pressure at the inlet port of said other port set in excess of the other predetermined value acting on one of said areas against the fluid pressure at the outlet port of said other port set acting on the other of said areas and the fluid pressure at the inlet port of said one port set acting on said one valve member when said one valve member is in its non-metering position to effect the metered increase in the fluid pressure at the outlet port of said other port set in excess of the other predetermined value.

46. The control valve according to claim 45, wherein said one and other areas are substantially equal.

47. The control valve according to claim 45, wherein said one area is predeterminately greater than said other area.

48. The control valve according to claim 45, comprising a valve seat on said housing between the inlet and outlet ports of said other port set for engagement with said other valve member, said other valve member being normally disengaged from said valve seat to establish open pressure fluid communication between the inlet and outlet ports of said other port set and being movable to its interrupting position into engagement with said valve seat in response to the movement of said one valve member toward its non-metering position, and said other valve member also being thereafter further movable toward its metering position disengaged from said valve seat to effect the metered proportional increase in the fluid pressure at the outlet port of said other port set in response to the increased fluid pressure in excess of the other predetermined value at the inlet port of said other port set acting on said one area and assisted by the force of said resilient means against the additive forces of the fluid pressure at the outlet port of said other port set acting on said other area and the fluid pressure at said inlet port of said one port set acting on said one valve member.

49. The control valve according to claim 45, comprising valve means on said other valve member for engagement with said valve seat, said valve means being engaged with said valve seat when said other valve member is in its interrupting position and disengaged from said valve seat when said other valve member is in its metering position.

50. The control valve according to claim 48, comprising another porton on said other valve member opposite to said valve means and movable in said housing in abutting engagement with said one valve member.

51. The control valve according to claim 48, comprising passage means in said other valve member for connection between the inlet and outlet ports of said other port set when said valve means is engaged with said valve seat, and said valve means including a portion defining uni-directional valve means for respective subjection to the fluid pressures at the inlet and outlet ports of said other port set and controlling said passage means, said uni-directional valve means being responsive to the magnitude of fluid pressure at the outlet port of said other port set in excess of that of the fluid pressure at the inlet port of said other port set respectively acting thereon to establish only the return flow of the fluid pressure at the outlet port of said other port set through said passage means.

References Cited

UNITED STATES PATENTS

| | | | |
|---|---|---|---|
| 3,148,364 | 9/1964 | Engels et al. | 303—84 X |
| 3,173,446 | 3/1965 | Mitchell | 303—84 X |

MILTON BUCHLER, Primary Examiner

JOHN J. McLAUGHLIN, Jr., Assistant Examiner

U.S. Cl. X.R.

60—54.5; 137—112, 119; 303—84; 188—151, 152

UNITED STATES PATENT OFFICE
CERTIFICATE OF CORRECTION

Patent No. 3,482,884                              December 9, 1969

Raymond J. Kersting

It is certified that error appears in the above identified patent and that said Letters Patent are hereby corrected as shown below:

Column 4, line 7, "areas" should read -- area --; line 12, "porportioning" should read -- proportioning --; line 52, after "$P_4A_3$" insert -- and --. Column 5, line 61, after "$P_2$" insert a comma. Column 8, line 6, after "defined" insert -- on --; line 33 after "112" insert -- to --. Column 11, line 62, "32a" should rea -- 133a --; line 69, "123" should read -- 133 --; line 70, "123a" should read -- 133a --. Column 16, line 57, "an" should read -- a --.

Signed and sealed this 16th day of February 1971.

(SEAL)
Attest:

Edward M. Fletcher, Jr.                          WILLIAM E. SCHUYLER, JR.
Attesting Officer                                      Commissioner of Patents